(12) United States Patent
Delaney et al.

(10) Patent No.: US 7,054,422 B2
(45) Date of Patent: May 30, 2006

(54) METHODS AND SYSTEMS FOR ACCESSING PEG COUNT INFORMATION GENERATED BY SIGNALING GATEWAY OR SIGNAL TRANSFER POINT

(75) Inventors: Robert J. Delaney, Raleigh, NC (US); John R. Lenns, Raleigh, NC (US); Owen H. Guion, Raleigh, NC (US); Richard E. Schaedler, New Hill, NC (US); Luis F. Guzman, Cary, NC (US)

(73) Assignee: Tekelec, Calabasas, CA (US)

(*) Notice: Subject to any disclaimer, the term of this patent is extended or adjusted under 35 U.S.C. 154(b) by 810 days.

(21) Appl. No.: 10/021,605

(22) Filed: Dec. 12, 2001

(65) Prior Publication Data

US 2002/0120771 A1  Aug. 29, 2002

Related U.S. Application Data

(60) Provisional application No. 60/255,038, filed on Dec. 12, 2000.

(51) Int. Cl.
*H04M 15/00* (2006.01)
*H04M 7/00* (2006.01)

(52) U.S. Cl. .............. 379/137; 379/221.03; 379/221.1; 370/236

(58) Field of Classification Search ................ 379/111, 379/112.01, 112.06, 112.07, 112.09, 133–137, 379/139, 221.1, 229–230, 221.03; 370/352–356, 370/386, 236, 236.2
See application file for complete search history.

(56) References Cited

U.S. PATENT DOCUMENTS

| | | | | |
|---|---|---|---|---|
| 5,056,086 A | * | 10/1991 | Libonati | 370/259 |
| 5,825,769 A | * | 10/1998 | O'Reilly et al. | 370/360 |
| 5,854,834 A | * | 12/1998 | Gottlieb et al. | 379/114.04 |
| 5,854,835 A | * | 12/1998 | Montgomery et al. | 379/112.06 |
| 5,867,558 A | * | 2/1999 | Swanson | 379/9.03 |
| 5,867,565 A | * | 2/1999 | Morikawa | 379/112.06 |
| 6,108,408 A | | 8/2000 | Plunkett et al. | |
| 6,137,869 A | | 10/2000 | Voit et al. | |
| 6,389,130 B1 | * | 5/2002 | Shenoda et al. | 379/221.08 |
| 6,560,226 B1 | * | 5/2003 | Torrey et al. | 370/360 |
| 6,668,051 B1 | | 12/2003 | Ashdown et al. | |
| 6,721,405 B1 | * | 4/2004 | Nolting et al. | 379/133 |
| 6,967,956 B1 | * | 11/2005 | Tinsley et al. | 370/466 |
| 2002/0131401 A1 | * | 9/2002 | Ehreth | 370/352 |
| 2004/0233851 A1 | * | 11/2004 | Baldwin et al. | 370/241 |
| 2006/0034267 A1 | * | 2/2006 | Torrey et al. | 370/360 |

OTHER PUBLICATIONS

Jacson et al., "SS7 network management using link monitors," IEEE, IEEE (USA), p. 883-888, ( Jul. 29, 1997).

* cited by examiner

*Primary Examiner*—Binh K. Tieu
(74) *Attorney, Agent, or Firm*—Jenkins, Wilson, Taylor & Hunt, P.A.

(57) ABSTRACT

A routing node (100) includes a usage measurements module (134) for polling internal processing modules (106) and communication link modules (102, 104, and 106) for usage measurements collected by these modules and forwarding the usage measurements to a general-purpose computing platform (136) via a high speed communication link (138). The usage measurements module (134) may include load sharing functionality that allows distribution of usage measurements collection among multiple usage measurements modules. The usage measurements module (134) may also include a reports generator for generating user-configurable reports.

50 Claims, 6 Drawing Sheets

METHODS AND SYSTEMS FOR ACCESSING PEG COUNT INFORMATION GENERATED BY SIGNALING GATEWAY OR SIGNAL TRANSFER POINT

RELATED APPLICATIONS

This application claims the benefit of U.S. provisional patent application Ser. No. 60/255,038, filed Dec. 12, 2000, the disclosure of which is incorporated herein by reference in its entirety.

TECHNICAL FIELD

The present invention relates to methods and systems for collecting information generated by a signaling gateway or signal transfer point. More particularly, the present invention relates to methods and systems for collecting usage measurements, such as peg counts, generated by a signal transfer point or signaling gateway.

RELATED ART

Signaling message routing nodes, such as signaling gateways and signal transfer points, typically include internal processing modules that process and route signaling messages. As used herein, the phrase "signaling message" is intended to refer to any message associated with network management or the setup, teardown, routing, or control of a call. Examples of signaling messages include SS7 signaling messages, SIP signaling messages, etc. These internal processing modules also generate peg count information based on signaling messages that they receive or process. Examples of such peg count information include the number of signaling messages having a particular originating point code, a particular destination point code, a particular circuit identification code, or other signaling message parameters.

This peg count information was conventionally accessed by an operations, administration, and maintenance module (OA&M) internal to the signal transfer point. The OA&M module polled the other internal processing modules to obtain the signaling information. The OA&M module then communicated the peg count information to an external proprietary interface box via a serial link. One example of such a proprietary interface is the SEAS™ interface available from Telcordia Technologies of Piscataway, New Jersey.

This method for accessing peg count information collected by a signaling gateway or a signal transfer point is undesirable for a variety of reasons. For example, the external proprietary interface module is only available from a limited number of vendors and can cost over $1 million. Another disadvantage associated with communicating peg count information to a proprietary interface module is that such communication is typically slow.

Yet another problem with the conventional methods for collecting peg count information that required an external proprietary interface is that the methods were not scalable. Because peg count information was collected by a single OA&M module that served multiple internal processing modules, the rate at which peg count information could be collected was limited by the processing capability of the OA&M module. Since the OA&M module performed other functions in addition to peg counting, conventional methods for collecting peg count information were limited in terms of performance.

Yet another problem associated with conventional peg counting systems is that these systems produced only static reports defined in system software. Generating new types of reports required software to be changed and re-compiled. Such a method for changing reports is inefficient because it required intervention of the manufacturer of the peg counting system for even minor changes to report content or format.

Accordingly, there exists a long-felt need for methods and systems for efficiently generating and accessing peg count information that avoids the difficulties associated with conventional systems.

DISCLOSURE OF THE INVENTION

The present invention includes improved methods and systems for generating and accessing peg count information in a network routing node, such as a signal transfer point or signaling gateway. As used herein, the term "peg counts or peg count information" refers to information that includes the number of messages or octets of a particular type, having a particular parameter or parameters, from a particular source, to a particular destination, or any other information used to evaluate the capacity or utilization of a network routing node, such as a signal transfer point or signaling gateway. Exemplary peg count information that may be collected by the present invention is described in GR-82-CORE, Signaling Transfer Point (STP) Generic Requirements, Issue Dec. 4, 2000, Telcordia Technologies, the disclosure of which is incorporated herein by reference in its entirety.

A typical signal transfer point or signaling gateway includes one or more internal signaling message processing modules that generate peg count information based on received or processed signaling messages. According to the present invention, a usage measurements module, separate from the operations, administration, and maintenance module, polls the internal processing modules for the peg count information. The usage measurements module then communicates the stored peg count information to an external device via a TCP/IP connection. The usage measurements module may also forward the peg count information to an internal permanent storage medium, such as a disk storage medium.

Providing a usage measurements module separate from the OA&M module that collects peg count information and communicates the peg count information to an external device is advantageous for a variety of reasons. For example, because the peg count information is communicated over an external TCP/IP connection, the need for an external proprietary interface device is eliminated. The proprietary interface device can be replaced by a general-purpose computer that receives and processes the peg count information. Such a computer may include network monitoring and/or billing applications that perform monitoring or billing functions based on the received peg count information. In addition, because TCP/IP links can be run over fast local area network connections, such as fast Ethernet, FDDI, or other local area network technologies, the speed at which peg count information is reported is increased.

According to another aspect of the invention, a method for load sharing between usage measurement modules is provided. A signaling gateway or signal transfer point may include a primary usage measurements module and one or more secondary usage measurements modules. The primary usage measurements module maintains a query list and distributes portions of the query list to each of the secondary usage measurements modules. The secondary usage measurements modules query individual processing modules for usage measurements based on their respective portions of the query list. The secondary usage measurements modules receive usage measurements from the internal processing modules and forward the usage measurements to the primary usage measurements module. The primary usage measurements module generates one or more reports based on the data received from the secondary usage measurements module and any data that the primary usage measurements module may have collected from other internal processing modules. The primary usage measurements module forwards the reports to the external processing platform via a high-speed network connection. Because usage measurements connection functionality is distributed among multiple processors or cards, the overall time for collecting usage measurements is reduced. In addition, the measurements capacity of the routing node is increased over conventional systems where a single operations, administration, and maintenance module was responsible for collecting the peg count information.

According to yet another aspect, the invention includes a report generator for generating user-configurable reports. The user may access a report template generator via a user interface and select parameters to be included in a report. The report template generator may verify that the report includes required attributes or parameters. If the report does not include the required parameters, report template generator may reject the report. If the report includes the required parameters, report template generator may forward the report to the report generator.

The report template generator may also allow the user to select whether to enable or disable the report. Enabled reports are sent to the report generator. Disabled reports may be stored for later use. The report generator may forward enabled reports to a report scheduler. The report scheduler schedules generation of the enabled reports. Because the present invention includes mechanisms for end users to define, alter, enable, and disable reports with requiring software upgrades, the report generation capability of the present invention provides increased flexibility over conventional static solutions.

BRIEF DESCRIPTION OF THE DRAWINGS

Preferred embodiments of the present invention will now be explained with reference to the accompanying drawings, of which.

DETAILED DESCRIPTION OF PREFERRED EMBODIMENTS

Figure 1:
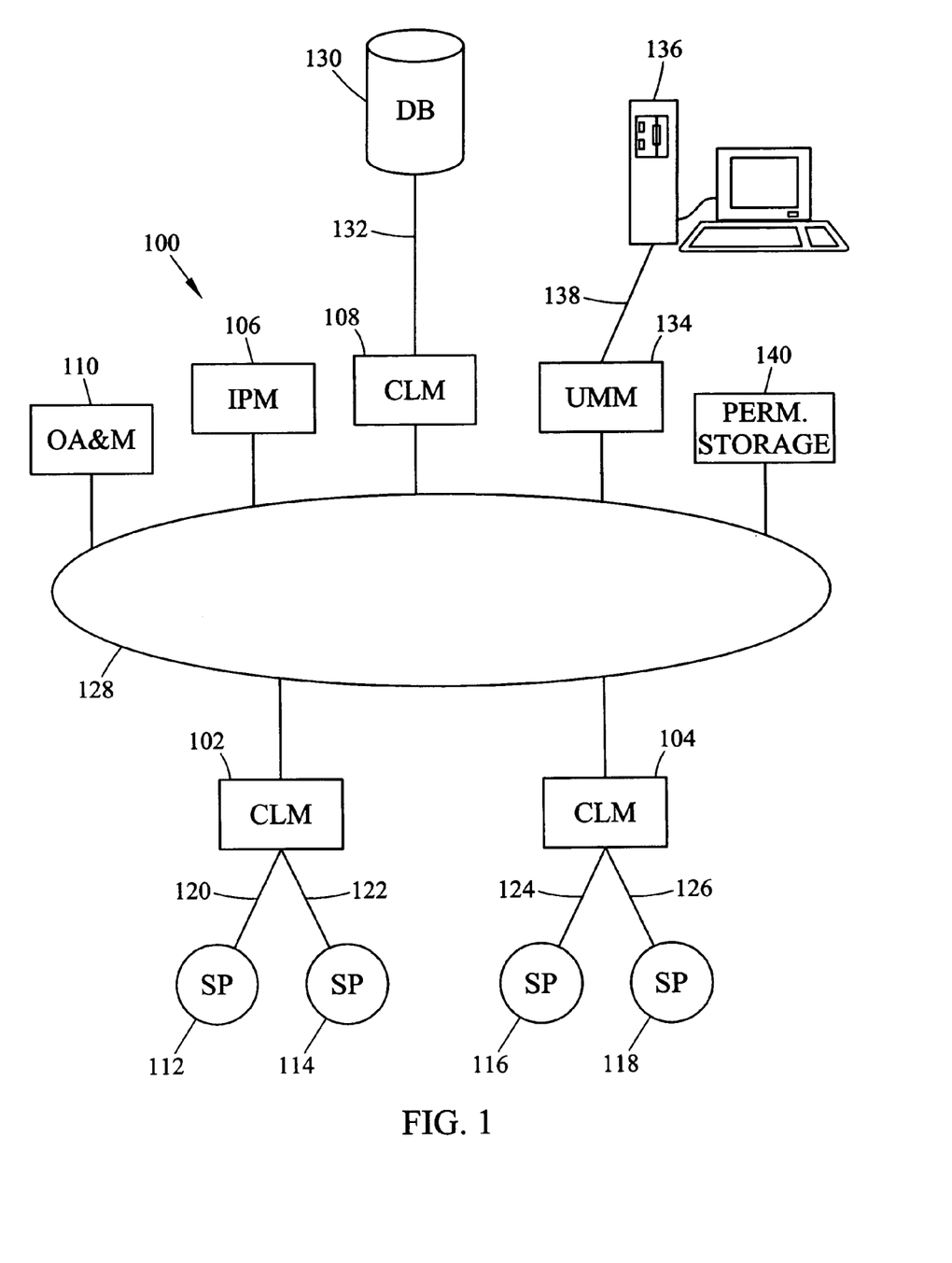
FIG. 1 is a block diagram of a routing node including a usage measurements module according to an embodiment of the present invention.

FIG. 1 illustrates an exemplary internal architecture of a signaling gateway including a usage measurements module according to an embodiment of the present invention. In FIG. 1, signaling gateway or STP 100 includes a plurality of modules for processing signaling messages. In the illustrated example, the modules include communication link modules (CLMs) 102 and 104, an internal processing module (IPM) 106, a CLM 108, and an OA&M module 110. Communication link modules 102 and 104 send and receive signaling messages from signaling points 112, 114, 116, and 118 via signaling links 120, 122, 124, and 126. Communication link modules 102 and 104 perform signaling levels 1–3 processing on received signaling messages, which includes routing received signaling messages to other modules internal to signaling gateway 100 for further processing. Communication link modules 102 and 104 may also perform layer 4 and above processing on received signaling messages, depending on the internal architecture of signaling gateway 100.

IPM module 106 performs SCCP/TCAP and other layer 4 and above processing of signaling messages received from communication link modules 102 and 104. Examples of such layer 4 and above processing includes global title translation, number portability translation, mobile query message processing, such as MAP screening, HLR/SMSC query message processing, etc. Signaling messages are communicated between the processing modules of signaling gateway 100 via interprocessor message transport (IMT) bus 128.

Communications link module 108 sends signaling messages to and receives signaling messages from external devices, such as database 130, via a signaling link 132. Accordingly, CLM 108 may include a TCP/IP protocol stack or a UDP/IP protocol stack for transferring such messages. In addition, if the signaling protocol is not compatible with TCP/IP or UDP/IP, CLM 108 may translate between TCP/IP and UDP/IP and the signaling protocol. For example, if the signaling protocol is SS7, which includes its own lower layer protocol stack, CLM 108 may translate between the lower layers of SS7 and TCP/IP or UDP/IP. A detailed description of exemplary functionality of CLM 108 can be found in PCT Publication No. WO 00/35155, the disclosure of which is incorporated herein by reference in its entirety. In an alternate embodiment, CLM 108 may implement the stream control transmission protocol, for example as described in IETF RFC 2960: "Stream Control Transmission Protocol," the disclosure of which is incorporated herein by reference in its entirety.

Communication link modules 102 and 104, internal processing module 106, and communication link module 108 generate peg count information based on received signaling messages, including SS7 and IP-based signaling messages. This peg count information has conventionally been communicated to OA&M module 110 at predetermined intervals. OA&M 110 then communicates the peg count information to an external proprietary interface box. Using an external proprietary interface box has a number of disadvantages that are discussed above.

According to the present invention, a new usage measurements module 134 is provided. Usage measurements module 134 polls internal processing modules of signaling gateway 100 to collect the peg count information at predetermined intervals. Usage measurements module 134 then communicates the peg count information to an external processing platform 136 via high-speed link 138. External message processing platform 136 may be a personal computer or workstation including an Ethernet or other local area network card. Using this configuration rather than an external proprietary interface box greatly reduces the time and expense of collecting peg count information.

Signaling gateway 100 may also include a permanent storage device 140 for receiving usage measurements, such as peg counts, from UMM 134. Providing permanent storage internal to signaling gateway 100 may be advantageous as a backup for the temporary storage provided on the other internal processing modules, especially when the information is being used for billing or accounting purposes. Alternatively, UMM 134 may forward the peg count information to OA&M module 110, which may include a permanent storage device so that the backup peg count information may be stored by OA&M module 110.

Figure 2:
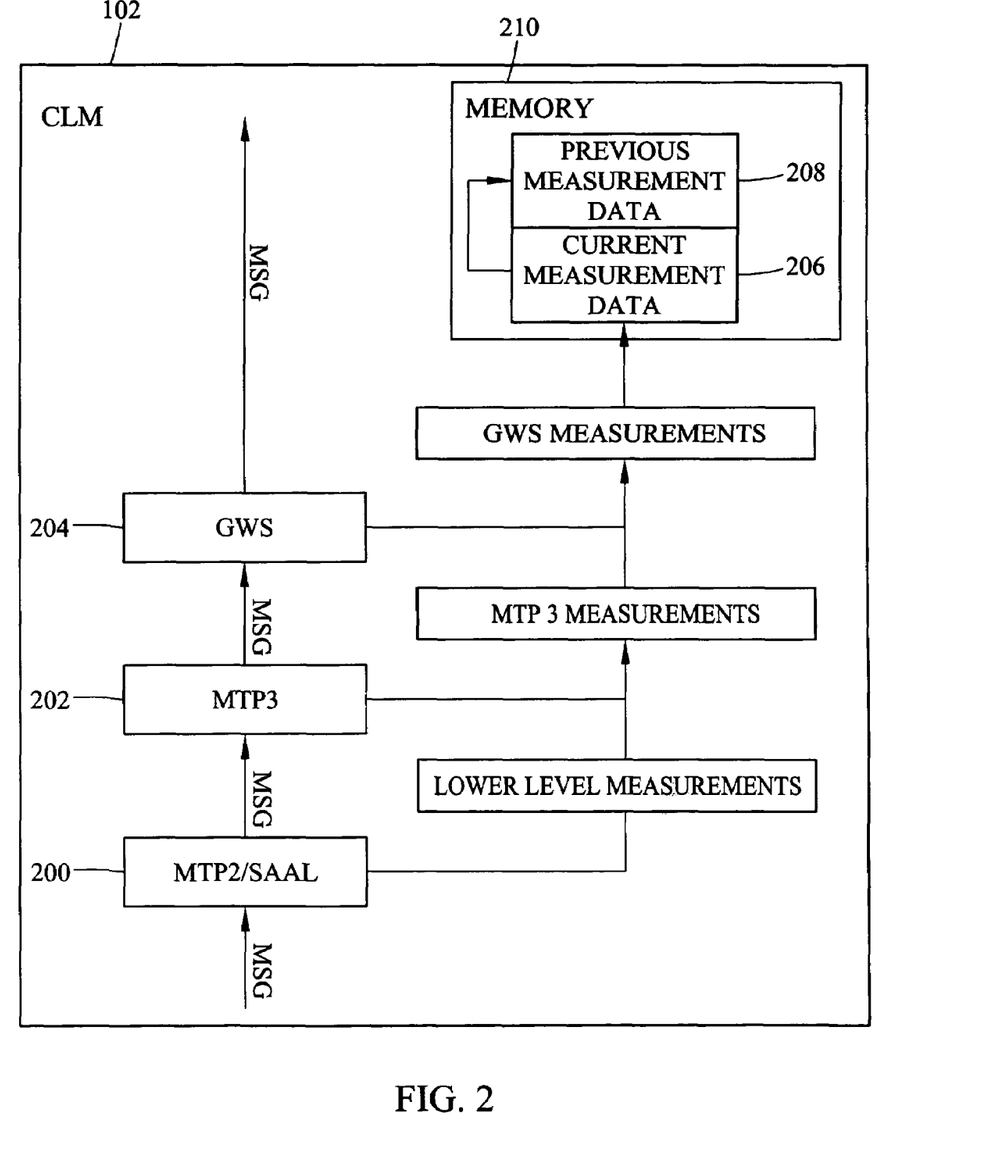
FIG. 2 is a block diagram of an exemplary communication link module 102 or 104 illustrated in FIG. 1.

FIG. 2 is a functional block diagram of an exemplary communication link module 102 illustrated in FIG. 1. In FIG. 2, communication link module 102 includes OSI layer 2 (data link) functionality, such as MTP2/SAAL layer 200, OSI layer 3 (network) functionality, such as MTP3 layer 202, gateway screening module 204, current measurement data store 206, and previous measurement data store 208 located in memory 210. MTP2/SAAL layer 200 performs MTP2 or SAAL processing of received messages, as appropriate. As the messages pass through layer 200, MTP2/SAAL layer 200 generates peg counts based on these lower level messages. Exemplary lower level measurements or peg counts that may be recorded include messages received in error, or link controlled events, such as out of service indications. Such measurements may be stored in local memory 210 on CLM 102.

Incoming messages that include components above the MTP2/SAAL layer may be passed to MTP3 layer 202. MTP3 layer 202 performs MTP3 functions, such as message routing. In addition, MTP3 layer 202 may generate measurements that can be derived from MTP3 information in received messages. Exemplary measurements that may be recorded by MTP3 layer 202 include the number of messages and octets terminated by the signal transfer point or signaling gateway, the number of messages and octets through switched by signal transfer point or signaling gateway, the number of messages requiring global title translation, or other internal processing by the signal transfer point or signaling gateway.

Following the processing by MTP3 layer 202, an incoming message may pass through gateway screening module 204. Gateway screening module 204 may screen messages based on one or more parameters in the messages, such as the destination point code. In addition, gateway screening module 204 may generate measurements based on screening actions, such as the number of messages screened for a particular point code or the number of messages passed for a particular point code.

Measurements collected by layers 200, 202, and 204 may be stored in current measurement data store 206 or previous measurement data store 208, depending on when the measurements were obtained. The measurement data collected by the components illustrated in FIG. 2 may include a collection of period-entity specific data that varies with CLM application. Typical sets of data that may be collected include five minute STP data, five minute link data, thirty minute STP data, thirty minute link data, thirty minute link set data, etc. For each period-entity data set, two data stores are maintained: current data and previous data. The current data may be compared with previous data to indicate whether the volume of messages handled by a routing node is increasing and whether capacity of one or more subsystems of the routing node needs to be increased.

Figure 3:
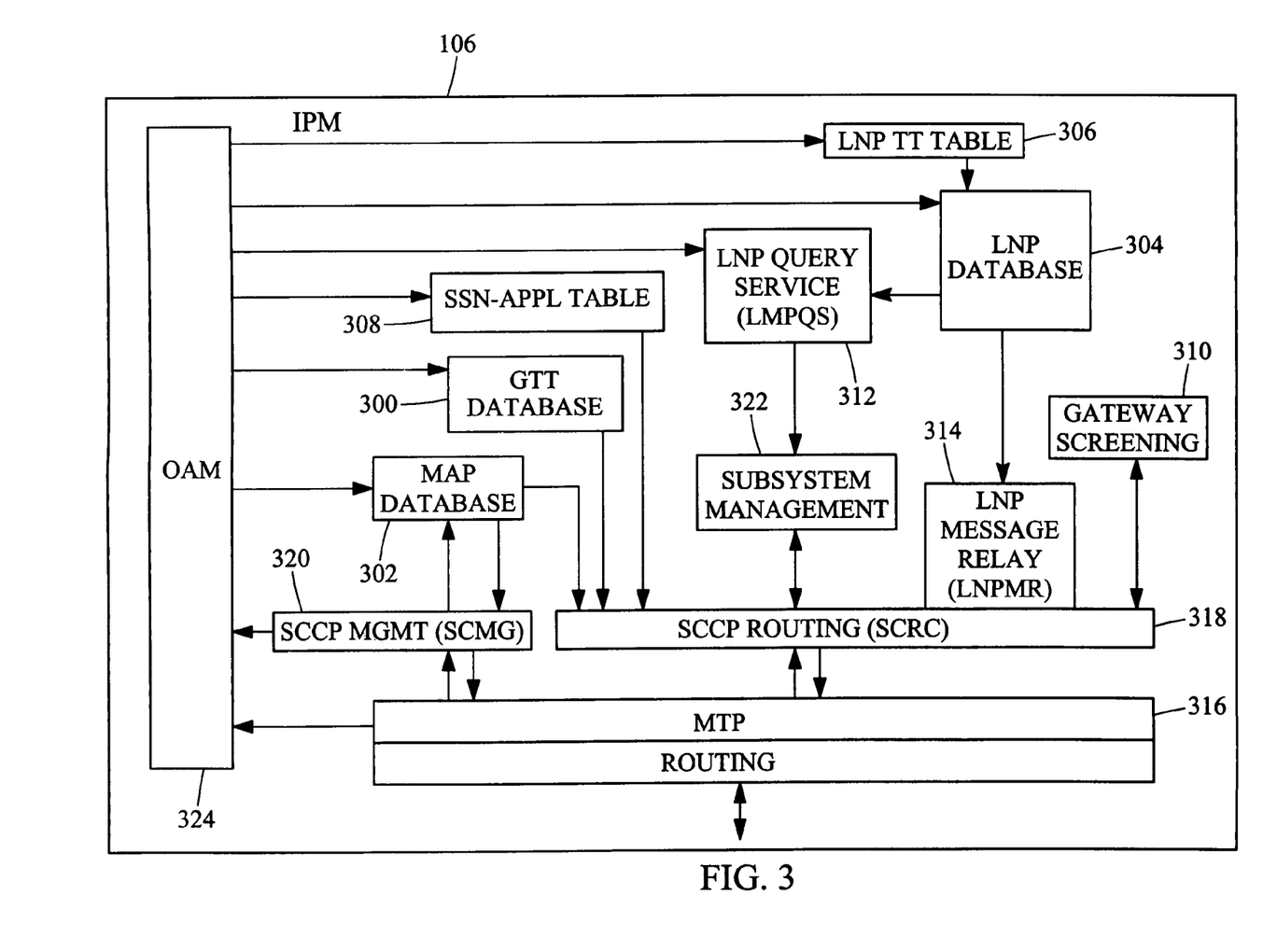
FIG. 3 is a block diagram of an exemplary internal processing module 106 illustrated in FIG. 1.

FIG. 3 illustrates an example of IPM 106 illustrated in FIG. 1. In FIG. 3, IPM 106 includes a plurality of internal processing modules that perform SCCP and higher layer processing of signaling messages. In this example, GTT and LNP modules are illustrated. It is understood that IPM 106 may perform functions other than global title translation and local number portability. For example, in an alternate embodiment, IPM 106 may include an HLR/SMSC query routing database, a mobile number portability database, and/or an international number portability database.

In the illustrated example, IPM 106 includes a global title translation database 300 for storing global title translation information, a mobile application part (MAP) database 302 for storing MAP information used in MAP screening, and a local number portability database 304 for storing local number portability translation information. IPM 106 also includes a plurality of tables that perform processing functions related to global title translation and local number portability processing. In particular, IPM 106 includes an LNP translation type table 306 for storing LNP translation types and a subsystem number application table 308 for storing subsystem numbers of subsystems present on IPM 106.

With regard to LNP processing, IPM 106 includes LNP query service module 312 and LNP message relay module 314. LNP query service module 312 performs lookups in LNP database 304. LNP query service module 312 also records measurements based on responses from LNP database 304. For example, LNP query service module 312 may record measurements, such as LNP queries received, LNP queries discarded, initial results, non-ported NPANXX lookups, and ported LRN lookups. LNP message relay module 314 relays LNP response messages to querying entities.

With regard to message routing, IPM 106 includes an MTP routing module 316 for routing incoming and outgoing query messages. In addition to MTP routing capabilities, IPM 106 includes a signaling connection routing controller (SCRC) 318 for performing SCCP routing functions. SCRC 318 may also record measurements related to global title translations, such as global title translations performed and global title translations failed.

With regard to management functions, IPM 106 includes an SCCP management module 320 for performing SCCP management functions, a subsystem management module 322 for managing the LNP subsystem, and an operations, administration, and maintenance module 324 for interfacing with OA&M module 110 illustrated in FIG. 1. In one embodiment, operations, administration, and maintenance module 324 may collect measurements from LNP query service module 312 and SCRC 318 and forward the measurements to OAM 110. However, because UMM module 134 automatically collects such measurements and forwards the measurements to external processing platform 136, the measurement functionality of OAM 324 is an optional feature and may not be necessary.

Figure 4:
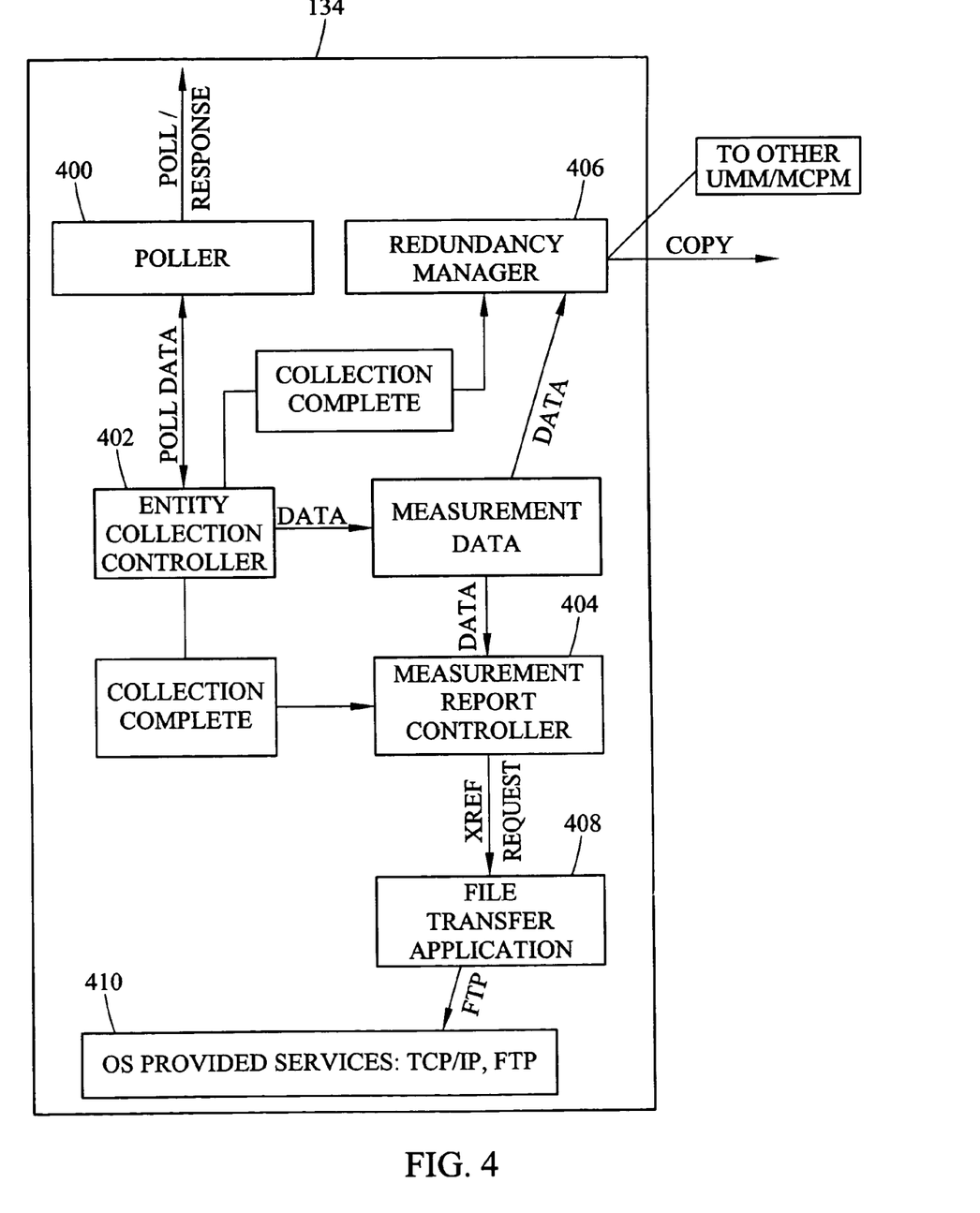
FIG. 4 is a block diagram of an exemplary usage measurements module 134 illustrated in FIG. 1.

FIG. 4 is a functional block diagram of UMM 134 according to an embodiment of the present invention. In FIG. 4, UMM 134 includes a poller 400 for polling internal processing modules 106 and communication link modules 102, 104, and 108 to obtain measurements collected by those modules. An entity collection controller 402 initiates polling for specific period entity data sets from CLM and IPM cards in the signal transfer point or signaling gateway. When entity collection controller 402 receives data from all of the internal processing modules and communication link modules, entity collection controller 402 processes the data, aggregates linkset and STP totals and stores the data in RAM. Entity collection controller 402 notifies measurement report controller 404 and redundancy manager 406 when collection and response to a particular poll is complete.

Measurement report controller 404 extracts relevant period-entity data for each required report, formats the data, and submits a transfer request to file transfer application 408. The reports generated by measurement controller 404 may be of a set format or a user-defined format.

File transfer application 408 may determine the availability of configured external applications for receiving measurements from UMM 134. For example, file transfer application 408 may be an FTP client. File transfer application 408 may communicate with an external FTP server, for example, residing on external message processing platform 136. In order to communicate with an external device, file transfer application 408 may utilize operating system provided services 410, such as FTP and TCP/IP.

Load Sharing and Scalability

According to another aspect of the invention, UMMs 134 perform load-sharing operations to distribute the measurement collection functionality of the present invention among multiple processors. Such load sharing allows the measurements capabilities of a routing node, such as signaling gateway 100 to be scaled with the message processing functionality.

Figure 5:
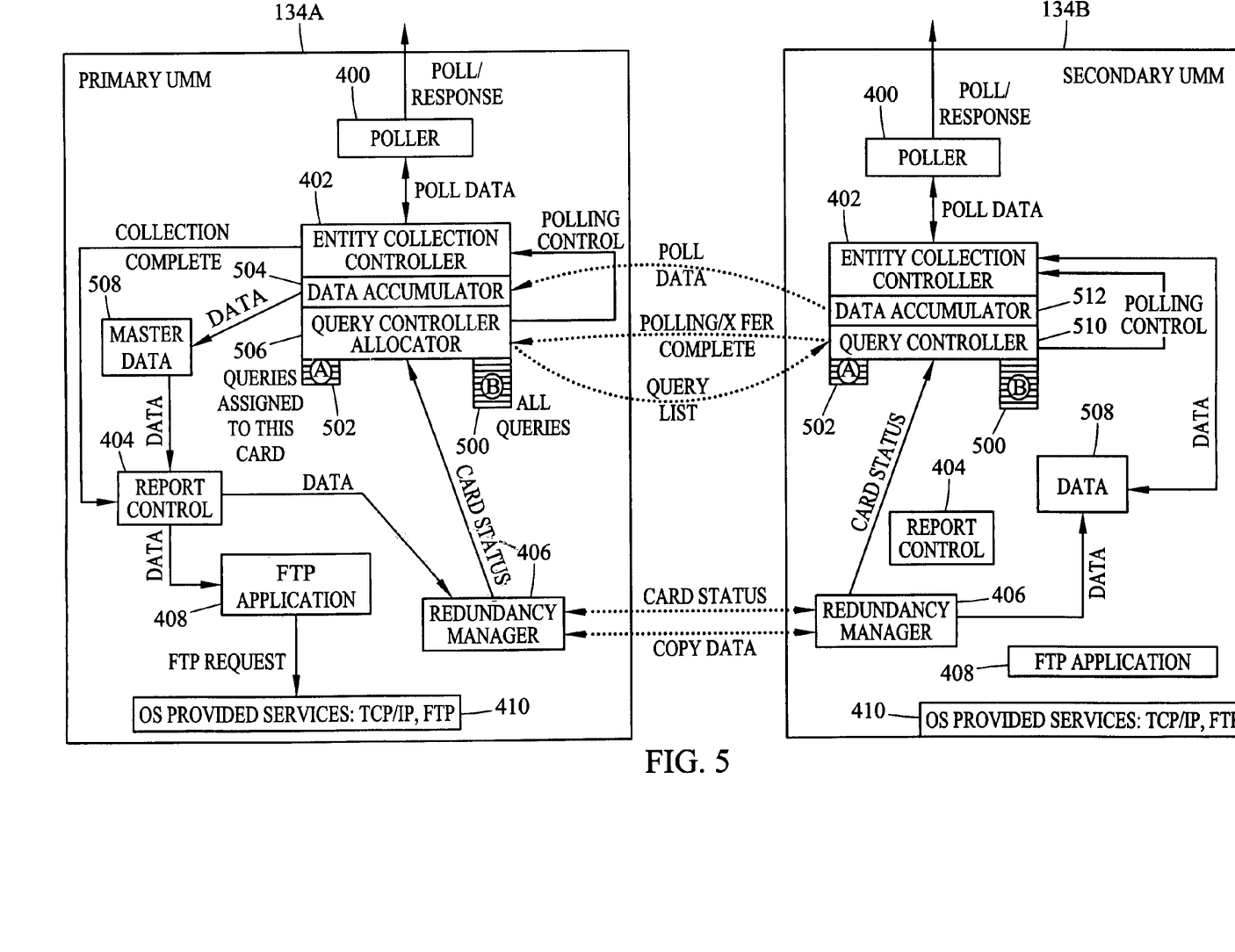
FIG. 5 is a block diagram of primary and secondary usage measurements modules illustrating a method for load sharing between usage measurements modules according to an embodiment of the present invention.

FIG. 5 is a block diagram of a primary UMM 134A and a secondary UMM 134B illustrating the load sharing functionality of UMMs according to an embodiment of the present invention. Referring to FIG. 5, in order to control collection of measurements, primary UMM 134A maintains a master query list 500 that stores measurement queries to be distributed to other UMMs, such as secondary UMM 134B. As used herein, the term "measurement query" refers to a message that may be sent by a UMM to an internal processing module requesting measurements for a particular time interval, such as all STP or link data for a particular 30 minute period. Each UMM collects usage measurements from CLMs 102, 104, and 108 and IPMs 106 according to the queries in each card's query list, indicated by reference numeral 502. By distributing portions of master query list 500 among multiple UMMs, the present invention reduces the overall measurements collection time and increases the scalability of a routing node, such as signaling gateway 100.

The UMMs collect stored data from the IPMs and CLMs for the most recent previous period for each entity for which the source card maintains peg counts, e.g., the CLMs may maintain separate storage for STP, LINK, LINKSET, linkset destination network indicator (LSDESTNI), and linkset origination network indicator (LSORIGNI) data. The query lists may be divided by logical entities, e.g. one query list may contain queries for all STP data, another query list may contain queries for all LSDESTNI data, or query lists may be divided by selected internal processing modules or CLMs.

In order to control the collection of measurements by multiple cards, primary UMM 134A includes a data accumulator 504 and a query controller/allocator 506. Data accumulator 504 collects polling data from all secondary UMMs, such as secondary UMM 134B and stores the data in master data store 508, which may be located in RAM on primary UMM 134A. Query controller/allocator 506 controls primary data accumulator 504, primary entity collection controller 502, and determines the portions of master query list 500 to be distributed to each UMM.

Secondary UMM 134B includes a query controller 510 and a data accumulator 512. Query controller 510 on secondary UMM 134B controls secondary data accumulator 512 and entity collection controller 402 on secondary UMM 134B. Data accumulator 512 accumulates data collected by secondary UMM 134B and stores the data in master data store 508 of UMM 134B. Secondary UMM 134B may optionally include a report controller 404, an FTP application 408, and OS provided services 410. However, these functions may be disabled or not used on secondary UMM 134B since reporting to external processing platform 136 may be preformed by primary UMM 134A.

Measurement Collection

At the start of a measurement collection cycle, query controllers 506 and 510 on UMMs 134A and 134B instruct their respective entity collection controllers 402 to initiate polling for the items in their respective query lists 502 from CLM and IPM cards. The IPM and CLM cards receive the queries and forward the requested peg count information to the querying UMM via IMT bus 128 illustrated in FIG. 1. Each entity collection controller 402 receives the peg count information and forwards the peg count information to data accumulator 504, which stores the data as it is being collected. When collection is complete, each UMM's entity collection controller 402 notifies its respective query controller 506, 508. Query controllers 506 and 508 notify data accumulators 504 and 510 and query controller/allocator 506 that polling is complete.

For secondary UMMs, such as secondary UMM 134B, data accumulator 512 sends received peg count information to data accumulator 504 and master data store 508 of primary UMM 134A. The polling data may also be written to data area 508 of secondary UMM 134B to reduce the likelihood of data loss when transferring data to data accumulator 504 of primary UMM 134A.

Data accumulator 504 of primary UMM 134A collects and stores poll data from secondary UMMs. When the data transfer is complete, secondary data accumulator 512 notifies secondary query controller 510. Secondary query controller then notifies query controller/allocator 506 of primary UMM 134A that data transfer is complete.

Once data accumulator 504 of primary UMM 134A has all of the peg count information collected for a particular poll, this data is written to master data memory 508 on primary UMM 134A and is then submitted to redundancy manager 406 of primary UMM 134A where it is copied to master data stores on each secondary UMM. The polling data may also be written a local hard disk on permanent storage module 140 for persistent measurement data retention due to a power loss.

Once data has been stored in master data 508, report controller 404 of primary UMM 134A extracts data for the relevant period specified by a report, formats the data and sends each report to file transfer application 408. File transfer application 408 forwards the data to external processing platform 136 over a high bandwidth link, such as a TCP/IP over Ethernet link, in the manner described above.

As discussed above, redundancy manager 406 of primary UMM 134A is responsible for copying the data to master data of each secondary UMM via redundancy manager 406 of each secondary UMM. Redundancy manager 406 of primary UMM 134A also keeps track of card status and in the event of failure of primary UMM 134A, transfers the role of primary UMM 134A to one of the secondary UMMs. Redundancy manager 406 may also modify the query lists in this event. For example, redundancy manager 406 may inform the query manager to redistribute queries previously assigned to a failed UMM. Redundancy manager 404 of primary UMM 134A may also conduct audits to verify the data integrity of other UMMs.

Configurable Measurement Reports

Figure 6:
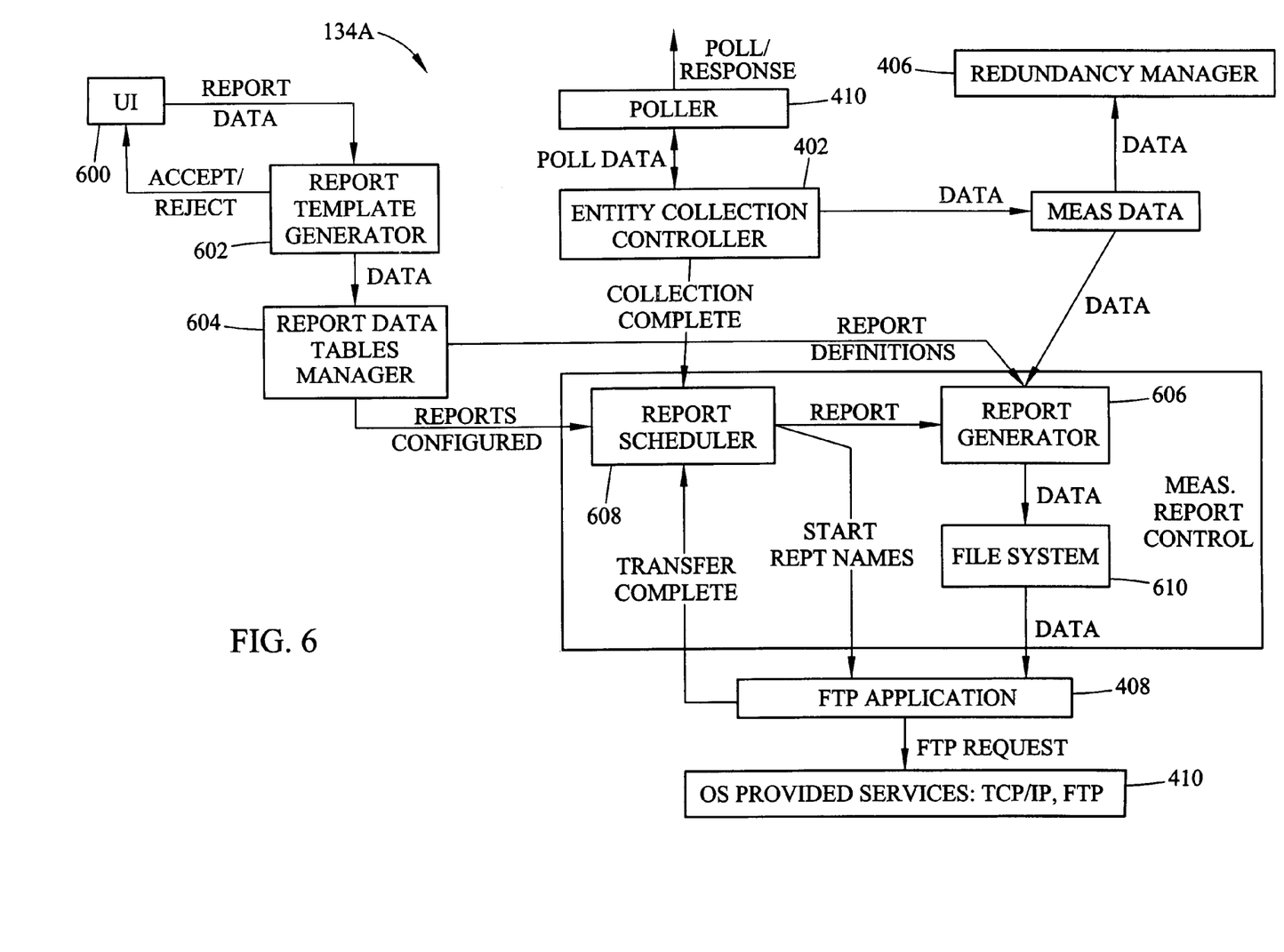
FIG. 6 is a block diagram of exemplary components of a usage measurements module for generating user-configurable measurements reports according to an embodiment of the present invention.

According to another aspect of the invention, a UMM may include configurable measurement report generation capabilities. FIG. 6 is a block diagram illustrating exemplary components of primary UMM 134A associated with configurable report generation according to an embodiment of the present invention. In FIG. 6, primary UMM 134A can be configured by a user interface 600, which may be a web interface, that allows a user, such as a network operator, to provision configurable reports on UMM 134A. A report template generator 602 may compare reports generated using user interface 600 against a standard template to ensure that each report contains predetermined attributes, such as usage measurements required by industry standards. Report template generator 602 may accept or reject a custom report based on whether the report includes all of the required attributes.

If the report is accepted by report template generator 602, the requested report and its attributes are forwarded to report data tables manager 604. Report data tables manager 604 stores the name of each report and indexes the name to the attributes of the report. Report data tables manager 604 may also determine reports that are active and inactive. An active report, as used herein, is a report that will be generated by UMM 134A. An inactive report is a report stored in tables managed by report data tables manager 604, but for which a report may not be generated. A user may select via user interface 600 whether a report is active or inactive without affecting the generation of other reports.

One example of a user configurable report may be a collective LINK network data collection (NDC) report. In one prior fixed report generation application, LINK measurement data is divided among two industry-defined reports: a component and maintenance daily report and a vendor-specific availability report. The end user may elect to create a single report to capture all LINK data in a single report. Conversely, the user may elect to define a report for link usage that contains only the registers for messages and octets transmitted and received. Generating any type of user-defined measurements report is intended to be within the scope of the invention.

Report data tables manager 604 stores all report definitions for use by report scheduler 608 and report generator 606. Report scheduler 606 initiates active report requests based on the configurable time period to report generator 606 to build custom reports from measurement data stored by primary UMM 134A. Report scheduler 606 may also notify file transfer application 408 that a custom report has been requested and should be produced. Report generator 608 builds and forwards the custom report to file system 610. File transfer application 408 then requests a file transfer and forwards the reports from file system 610 to external processing platform 136. Because the present invention include configurable report generation capabilities, report content can be changed without a software upgrade to a routing node, such as signal transfer point or signaling gateway.

It will be understood that various details of the invention may be changed without departing from the scope of the invention. Furthermore, the foregoing description is for the purpose of illustration only, and not for the purpose of limitation—the invention being defined by the claims.

What is claimed is:

1. A method for generating and accessing usage measurements data associated with signaling messages routed or processed by a signaling message routing node in a communications network, the method comprising:
   (a) receiving a signaling message at a communication link module (CLM) located within a signaling message routing node for routing signaling messages between other nodes in a communications network;
   (b) generating and storing first peg count information on the CLM based on information contained within the signaling message;
   (c) from a first usage measurements module (UMM) within the signaling message routing node, polling the CLM to request the first peg count information;
   (d) in response to the polling, sending the first peg count information to the first UMM; and
   (e) communicating the first peg count information from the first UMM to an application located on a general-purpose computing platform external to the signaling message routing node via an IP communication link.

2. The method of claim 1 wherein the CLM comprises a time division multiplexed (TDM)-based signaling link interface module.

3. The method of claim 1 wherein the CLM comprises an asynchronous transfer mode (ATM)-based signaling link interface module.

4. The method of claim 1 wherein the CLM comprises an IP-based signaling link interface module.

5. The method of claim 1 wherein storing first peg count information on the CLM includes storing information in random access memory (RAM).

6. The method of claim 1 comprising storing the first peg count information on a disk storage medium.

7. The method of claim 1 wherein generating first peg count information includes generating the first peg count information based on at least one of an origination point code (OPC) value, a destination point code (DPC) value, a called party address (CdPA) value, and a calling party address (CgPA) contained in the signaling message.

8. The method of claim 1 wherein sending the first peg count information to the first UMM includes sending the first peg count information to the first UMM via a communication bus that connects the CLM and the first UMM.

9. The method of claim 1 comprising forwarding the first peg count information from the first UMM to an operations, administration, and maintenance module internal to the signaling message routing node.

10. The method of claim 1 comprising routing the signaling message from the CLM to an internal processing module (IPM) within the signaling message routing node.

11. The method of claim 10 comprising:
   (a) receiving the signaling message at the IPM;
   (b) generating and storing second peg count information on the IPM;
   (c) from the first UMM, polling the IPM to request the second peg count information;
   (d) in response to the polling, sending the second peg count information to the first UMM; and
   (e) communicating the second peg count information from the first UMM to the general-purpose computing platform via the IP communication link.

12. The method of claim 11 comprising performing SCCP/TCAP processing on the signaling message at the IPM.

13. The method of claim 12 wherein the SCCP/TCAP processing includes number portability processing and the second peg count information relates to the number portability processing.

14. The method of claim 12 wherein the SCCP/TCAP processing includes global title translation (GTT) processing and the second peg count information relates to the GTT processing.

15. The method of claim 12 comprising, at the IPM, performing triggerless number portability processing on the signaling message and wherein the second peg count information relates to the triggerless LNP processing.

16. The method of claim 12 comprising, at the IPM, performing intelligent network (IN) processing on the signaling message and wherein the second peg count information relates to the IN processing.

17. The method of claim 12 comprising, at the IPM, performing TCAP processing on the signaling message, and wherein the second peg count information relates to the TCAP processing.

18. The method of claim 1 comprising:
   (a) receiving a plurality of signaling messages at a plurality of communication link modules within the signaling message routing node;
   (b) at each of the communication link modules, generating peg counts for the signaling messages;
   (c) polling the communication link modules from the first usage measurements module;
   (d) forwarding the peg counts from the communication link modules to the first usage measurements module; and
   (e) forwarding the peg counts from the first usage measurements module to the general-purpose computing platform via the IP communication link.

19. The method of claim 18 comprising polling at least some of the communication link modules from a second usage measurements module and forwarding at least some of the peg counts to the second usage measurements module.

20. The method of claim 1 wherein generating the first peg count information includes maintaining a count of a number of messages satisfying predetermined criteria.

21. A method for load sharing between usage measurements modules within a routing node, the method comprising:
   (a) maintaining, at a primary usage measurements module, a master query list including queries for usage measurements or peg count information;
   (b) distributing a portion of the master query list to at least one secondary usage measurements module;
   (c) forwarding queries from the primary and secondary usage measurements modules to internal processing modules within the routing node;
   (d) receiving usage measurements in response to the queries; and
   (e) aggregating the usage measurements at the primary usage measurements module.

22. The method of claim 21 comprising forwarding the aggregated query messages from the primary usage measurements module to an external message processing platform via a high speed communications link.

23. The method of claim 21 comprising, at the primary usage measurements module, monitoring the status of secondary usage measurements modules, and, in response to detecting failure of one of the secondary usage measurements modules, re-allocating portions of the master query list.

24. The method of claim 21 comprising, at the secondary usage measurements module, monitoring the status of the primary usage measurements module, and, in response to detecting failure of the primary usage measurements module, assuming the role of the primary usage measurements module.

25. A system for generating and accessing usage measurements associated with signaling message packets routed through a packet routing node in a communications network, the system comprising:
   a signaling message routing node for routing signaling messages between other nodes in a communications network, the signaling message routing node including:
   (a) a communication link module (CLM) located within the signaling message routing node and being adapted to receive a signaling message and to generate and store first peg count information based on information contained within the signaling message; and
   (b) a first usage measurements module (UMM) located within the signaling message routing node and for polling the CLM, receiving the first peg count information from the CLM, and for communicating the first peg count information to external devices over a high-speed communication link.

26. The system of claim 25 wherein the CLM comprises a signaling system 7 signaling link interface module (LIM).

27. The system of claim 25 wherein the CLM comprises an IP capable data communications module (DCM).

28. The system of claim 25 wherein the CLM includes random access memory (RAM) for temporarily storing the first peg count information.

29. The system of claim 25 wherein the communication link module includes a plurality of layers and each layer generates peg counts for received messages.

30. The system of claim 25 wherein the first usage measurements module includes:
   (a) a poller for polling the communications link module to obtain the first peg count information;
   (b) an entity collection controller for controlling the poller;
   (c) a measurement report controller for generating reports based on the first peg count information; and
   (d) a file transfer application for sending the reports to external devices over the high speed communication link.

31. The system of claim 25 comprising a disk storage device operatively associated with the first UMM for storing the first peg count information.

32. The system of claim 25 wherein the first peg count information is based on at least one of an origination point code (OPC) value, a destination point code (DPC) value, a called party address (CdPA) value, and a calling party address (CgPA) value contained in the signaling message.

33. The system of claim 25 wherein the CLM is adapted to send the first peg count information to the first UMM via a communication bus that connects the CLM and the first UMM.

34. The system of claim 25 comprising an internal processing module (IPM) for performing internal processing operations on received signaling messages and for generating second peg count information based on the processing operations.

35. The system of claim 34 wherein the first UMM is adapted to poll the IPM and receive the second peg count information from the IPM.

36. The system of claim 34 wherein the IPM includes a signaling connection control part/transaction capabilities application part (SCCP/TCAP) processing module and the second peg count information relates to SCCP/TCAP messages.

37. The system of claim 36 wherein the SCCP/TCAP processing module includes a number portability processor and the second peg count information relates to number portability queries or responses.

38. The system of claim 36 wherein the SCCP/TCAP processing module includes a global title translation (GTT) processor and the second peg count information relates to global title translations.

39. The system of claim 25 comprising a general-purpose computer coupled to first UMM via the high speed link for receiving the first peg count information.

40. The system of claim 25 comprising at least one second UMM for polling the communications link module for peg count information.

41. The system of claim 40 wherein the first UMM is adapted to control peg count collection by the second UMM.

42. The system of claim 41 wherein the first UMM maintains a master query list and distributes a portion of the master query list to the second UMM to control peg count collection by the second UMM.

43. The system of claim 25 wherein the first UMM includes a report generator for generating user-configurable reports in response to user-specified parameters.

44. The system of claim 25 comprising a plurality of communication link modules located within the signaling message routing node for generating and storing peg counts and for forwarding the peg counts to the first usage measurements module in response to polling.

45. The system of claim 25 wherein generating the peg count information includes maintaining counts of numbers of messages satisfying predetermined criteria.

46. A peg count collection system comprising:
(a) a signaling message routing node for routing signaling messages between other nodes in a communications network and including a plurality of processing modules located within the signaling message routing node for generating peg count information based on received or processed signaling messages and a first usage measurements module for polling the first internal processing modules to obtain the peg count information and for forwarding the peg count information to an external device via a TCP/IP connection; and
(b) general-purpose computing platform external to the signaling message routing node for receiving the peg count information via the TCP/IP connection and for processing the peg count information.

47. The system of claim 46 wherein the general-purpose computing platform includes a billing application for generating bills based on the peg count information.

48. The system of claim 46 wherein the general-purpose computing platform includes a billing verification application for verifying bills for telecommunications services based on the peg count information.

49. The system of claim 46 wherein the general-purpose computing platform includes a usage measurements application for generating usage measurement reports based on the peg count information.

50. The system of claim 46 wherein generating the first peg count information includes maintaining a count of messages satisfying predetermined criteria.

* * * * *